(12) United States Patent
Kim et al.

(10) Patent No.: US 12,170,170 B2
(45) Date of Patent: Dec. 17, 2024

(54) MULTILAYER ELECTRONIC COMPONENT

(71) Applicant: SAMSUNG ELECTRO-MECHANICS CO., LTD., Suwon-si (KR)

(72) Inventors: Jun Hyeong Kim, Suwon-si (KR); Myung Jun Park, Suwon-si (KR); Jin Soo Park, Suwon-si (KR); Yeon Song Kang, Suwon-si (KR); Eun Jin Kim, Suwon-si (KR); Kyu Sik Park, Suwon-si (KR); Kang Ha Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 342 days.

(21) Appl. No.: 17/523,198

(22) Filed: Nov. 10, 2021

(65) Prior Publication Data

US 2022/0208462 A1 Jun. 30, 2022

(30) Foreign Application Priority Data

Dec. 24, 2020 (KR) ........................ 10-2020-0183844

(51) Int. Cl.
*H01G 4/232* (2006.01)
*H01G 4/008* (2006.01)
*H01G 4/30* (2006.01)

(52) U.S. Cl.
CPC ......... *H01G 4/2325* (2013.01); *H01G 4/0085* (2013.01); *H01G 4/30* (2013.01)

(58) Field of Classification Search
None
See application file for complete search history.

(56) References Cited

U.S. PATENT DOCUMENTS 3,452,257 A * 6/1969 Belko, Jr. .............. H01G 4/232
361/308.1
3,612,963 A * 10/1971 Piper ....................... H01G 4/30
361/309

(Continued)

FOREIGN PATENT DOCUMENTS

CN 103310978 A * 9/2010 ............. H01G 4/012
CN 103102153 A * 5/2013 ......... C04B 35/4682

(Continued)

*Primary Examiner* — Timothy J. Dole
*Assistant Examiner* — Muhammed Azam
(74) *Attorney, Agent, or Firm* — MORGAN, LEWIS & BOCKIUS LLP (57) ABSTRACT

A multilayer electronic component, includes: a body including a dielectric layer, and first and second internal electrodes alternately disposed in a first direction with the dielectric layer interposed therebetween; a first connection portion including a first conductive layer disposed on the third surface and connected to the first internal electrode, and a first insulating layer disposed on the first conductive layer; a second connection portion including a second conductive layer disposed on the fourth surface and connected to the second internal electrode, and a second insulating layer disposed on the second conductive layer; a first external electrode including a first electrode layer connected to the first conductive layer, wherein the first external electrode is disposed on any one of the first, second, fifth, and sixth surfaces; and a second external electrode including a second electrode layer connected to the second conductive layer.

34 Claims, 9 Drawing Sheets

(56) References Cited

U.S. PATENT DOCUMENTS

| | | | | |
|---|---|---|---|---|
| 3,665,267 A * | 5/1972 | Acello | H01G 2/065 | 361/309 |
| 6,982,863 B2 * | 1/2006 | Galvagni | H01G 4/232 | 361/306.3 |
| 7,605,683 B2 * | 10/2009 | Sawada | H01G 4/2325 | 338/307 |
| 7,933,113 B2 * | 4/2011 | Motoki | H01G 4/30 | 361/306.3 |
| 8,228,663 B2 * | 7/2012 | Takeuchi | H01G 4/2325 | 361/321.1 |
| 9,111,682 B2 * | 8/2015 | Sawada | H01G 4/012 | |
| 9,390,852 B2 * | 7/2016 | Lee | H01G 2/06 | |
| 9,520,232 B2 * | 12/2016 | Nishisaka | H01G 4/248 | |
| 9,520,237 B2 * | 12/2016 | Nishisaka | H01G 4/248 | |
| 9,595,391 B2 * | 3/2017 | Inoue | H01G 4/0085 | |
| 9,627,143 B2 * | 4/2017 | Sawada | H01G 4/008 | |
| 9,666,366 B2 * | 5/2017 | Ritter | H01G 4/12 | |
| 9,685,272 B2 * | 6/2017 | Ahn | H01G 4/30 | |
| 9,974,183 B2 * | 5/2018 | Chae | H01G 4/30 | |
| 10,192,685 B2 * | 1/2019 | Park | H05K 1/181 | |
| 10,204,739 B1 * | 2/2019 | Ji | H01G 4/232 | |
| 10,297,388 B2 * | 5/2019 | Kato | H01G 4/224 | |
| 10,304,631 B2 * | 5/2019 | Morita | H01G 4/012 | |
| 10,347,427 B2 * | 7/2019 | Park | H01G 4/2325 | |
| 10,366,834 B1 * | 7/2019 | Lee | H01G 4/012 | |
| 10,395,840 B1 * | 8/2019 | Park | H01G 2/065 | |
| 10,418,191 B2 * | 9/2019 | Nishisaka | H01G 4/2325 | |
| 10,504,652 B2 * | 12/2019 | Nakazawa | H01G 4/30 | |
| 10,529,491 B1 * | 1/2020 | Kim | H01G 4/232 | |
| 10,529,492 B1 * | 1/2020 | Jo | H01G 4/005 | |
| 10,643,781 B2 * | 5/2020 | Shimoyasu | H01F 27/292 | |
| 10,650,971 B2 * | 5/2020 | Jung | H01G 4/308 | |
| 10,991,512 B2 * | 4/2021 | Park | H01G 4/12 | |
| 11,004,604 B2 * | 5/2021 | Zaima | H01G 4/012 | |
| 11,011,307 B2 * | 5/2021 | Harada | H01G 4/2325 | |
| 11,587,735 B2 * | 2/2023 | Park | H01G 4/30 | |
| 11,610,737 B2 * | 3/2023 | Chikuma | H01G 4/30 | |
| 11,657,975 B2 * | 5/2023 | Jung | H01G 4/30 | 361/306.3 |
| 11,798,747 B2 * | 10/2023 | Yi | H01G 4/008 | |
| 2009/0226705 A1 * | 9/2009 | Motoki | H01G 4/30 | 428/323 |
| 2009/0268374 A1 * | 10/2009 | Motoki | H01G 4/30 | 361/321.2 |
| 2009/0316329 A1 * | 12/2009 | Nomura | H05K 1/186 | 361/301.1 |
| 2010/0202098 A1 * | 8/2010 | Yanagida | H01G 4/30 | 361/321.1 |
| 2011/0007449 A1 * | 1/2011 | Seo | H01G 4/232 | 361/321.2 |
| 2012/0320495 A1 * | 12/2012 | Akazawa | H01G 4/005 | 361/321.2 |
| 2013/0242456 A1 * | 9/2013 | Lee | H01G 4/30 | 361/301.4 |
| 2013/0242457 A1 * | 9/2013 | Lee | H01G 4/2325 | 361/301.4 |
| 2013/0250480 A1 * | 9/2013 | Ahn | H01G 4/129 | 156/89.12 |
| 2014/0022691 A1 * | 1/2014 | Kwag | H01G 4/12 | 361/301.4 |
| 2014/0029157 A1 * | 1/2014 | Kwag | H01G 4/232 | 361/301.4 |
| 2014/0063684 A1 * | 3/2014 | Lee | H01G 4/30 | 156/89.18 |
| 2014/0083755 A1 * | 3/2014 | Lee | H05K 1/181 | 338/21 |
| 2014/0124251 A1 * | 5/2014 | Park | H01F 17/0013 | 336/200 |
| 2014/0204502 A1 * | 7/2014 | Chun | H01G 4/30 | 361/301.4 |
| 2014/0209364 A1 * | 7/2014 | Oh | B24B 19/22 | 361/301.4 |
| 2014/0233149 A1 * | 8/2014 | Jeon | H01G 4/232 | 427/79 |
| 2014/0290999 A1 * | 10/2014 | Park | H01G 4/30 | 29/25.03 |
| 2015/0022945 A1 * | 1/2015 | Park | H01G 4/2325 | 156/89.18 |
| 2015/0090485 A1 * | 4/2015 | Lee | H01G 4/30 | 361/301.4 |
| 2015/0114702 A1 * | 4/2015 | Lee | H01G 4/012 | 361/301.4 |
| 2015/0124370 A1 * | 5/2015 | Ahn | H01G 4/12 | 361/272 |
| 2015/0136463 A1 * | 5/2015 | Lee | H01G 4/232 | 361/301.4 |
| 2015/0243438 A1 * | 8/2015 | Ahn | H01G 2/065 | 174/258 |
| 2015/0332852 A1 * | 11/2015 | Kim | H01G 2/065 | 361/301.4 |
| 2015/0340154 A1 * | 11/2015 | Kim | H01G 2/22 | 361/275.1 |
| 2015/0348711 A1 * | 12/2015 | Kim | H05K 1/181 | 361/301.4 |
| 2017/0301468 A1 * | 10/2017 | Kim | H01G 4/30 | |
| 2017/0367187 A1 * | 12/2017 | Chae | H05K 1/181 | |
| 2018/0144869 A1 * | 5/2018 | Yoon | H01G 4/30 | |
| 2018/0268998 A1 * | 9/2018 | Onodera | H01G 4/248 | |
| 2019/0066923 A1 * | 2/2019 | Jung | H01G 4/008 | |
| 2019/0148070 A1 * | 5/2019 | Kobayashi | H01G 4/232 | 174/260 |
| 2019/0355522 A1 * | 11/2019 | Kanbe | H01G 4/232 | |
| 2020/0194181 A1 * | 6/2020 | Kim | H01G 4/248 | |
| 2020/0273621 A1 * | 8/2020 | Yi | H01G 4/248 | |
| 2021/0027945 A1 * | 1/2021 | Takahashi | H01G 4/2325 | |
| 2021/0065982 A1 * | 3/2021 | Jung | H01G 4/2325 | |
| 2022/0208462 A1 * | 6/2022 | Kim | H01G 4/30 | |
| 2022/0208466 A1 * | 6/2022 | Kim | H01G 4/008 | |
| 2023/0215642 A1 * | 7/2023 | Gu | H01G 4/30 | 361/301.4 |

FOREIGN PATENT DOCUMENTS

| | | | | |
|---|---|---|---|---|
| CN | 104347269 A * | 2/2015 | | H01G 4/005 |
| CN | 104576056 A * | 4/2015 | | H01G 2/065 |
| CN | 106910628 A * | 6/2017 | | H01G 4/012 |
| CN | 107045648 A * | 8/2017 | | H01F 17/0013 |
| CN | 114613597 A * | 6/2022 | | H01G 4/008 |
| KR | 10-1434108 B1 | 8/2014 | | |
| KR | 10-2019-0067137 A | 6/2019 | | |
| WO | WO-2007105865 A1 * | 9/2007 | | B32B 18/00 |

\* cited by examiner

MULTILAYER ELECTRONIC COMPONENT

CROSS-REFERENCE TO RELATED APPLICATION(S)

This application claims the benefit of priority to Korean Patent Application No. 10-2020-0183844 filed on Dec. 24, 2020, in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a type of multilayer electronic component, is a chip type condenser, mounted on the printed circuit boards of various types of electronic products, including image display devices, such as a liquid crystal display (LCD) and a plasma display panel (PDP), a computer, a smartphone, a mobile phone, and the like, serving to charge or discharge electricity.

The multilayer ceramic capacitor may be used as a component of various electronic devices due to advantages thereof, such as miniaturization, high capacitance, and ease of mounting. As electronic devices such as computers and mobile devices are miniaturized and implemented with high output, demand for miniaturization and implementation of high capacitance of a multilayer ceramic capacitor are increasing.

In addition, as the electronics industry has recently seen increased interest in automotive electronic components, multilayer ceramic capacitors are also required to have high reliability characteristics in order to be used in automobiles or infotainment systems.

In order to miniaturize and increase the capacity of the multilayer ceramic capacitor, it is necessary to increase the number of stacks by forming thin internal electrodes and dielectric layers, and it is necessary to increase an effective volume fraction required for implementing capacitance by thinning external electrodes.

Conventionally, when forming the external electrode, a method of dipping an exposed surface of the internal electrode of the body into a paste using a paste containing a conductive metal has been mainly used.

However, in the external electrode formed by the dipping method, there may be a problem that a thickness of the external electrode in a central portion in a thickness direction is too thick, and external electrodes may be formed on surfaces except for the exposed surface of the internal electrode of the body, making it difficult to secure a highly effective volume ratio.

SUMMARY

An aspect of the present disclosure is to provide a multilayer electronic component having improved capacitance per unit volume.

An aspect of the present disclosure is to provide is to provide a multilayer electronic component having improved reliability.

According to an aspect of the present disclosure, a multilayer electronic component, may include: a body including a dielectric layer, and first and second internal electrodes alternately disposed in a first direction with the dielectric layer interposed therebetween, and including first and second surfaces opposing in the first direction, third and fourth surfaces connected to the first and second surfaces and opposing in a second direction, and fifth and sixth surfaces connected to the first to fourth surfaces and opposing in a third direction; a first connection portion including a first conductive layer disposed on the third surface and connected to the first internal electrode, and a first insulating layer disposed on the first conductive layer; a second connection portion including a second conductive layer disposed on the fourth surface and connected to the second internal electrode, and a second insulating layer disposed on the second conductive layer; a first external electrode including a first electrode layer connected to the first conductive layer, and a first plating layer disposed on the first electrode layer, wherein the first external electrode is disposed on anyone of the first, second, fifth, and sixth surfaces; and a second external electrode including a second electrode layer connected to the second conductive layer, and a second plating layer disposed on the second electrode layer, wherein the second external electrode is disposed on a surface on which the first external electrode is disposed to be spaced apart from the first external electrode.

According to an aspect of the present disclosure, a multilayer electronic component, may include: a body including a dielectric layer, and first and second internal electrodes disposed in a first direction with the dielectric layer interposed therebetween, and including first and second surfaces opposing in the first direction, and third and fourth surfaces connected to the first and second surfaces and opposing in a second direction; a first connection portion including a first conductive layer disposed on the third surface and connected to the first internal electrode; a second connection portion including a second conductive layer disposed on the fourth surface and connected to the second internal electrode; a first external electrode including a first electrode layer connected to the first conductive layer, wherein the first external electrode is disposed on any surface of the body other than the third and fourth surfaces; and a second external electrode including a second electrode layer connected to the second conductive layer, wherein the second external electrode is disposed to be spaced apart from the first external electrode on a surface on which the first external electrode is disposed, wherein at least one of the first and second electrode layers includes glass.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments of the present disclosure will be described as follows with reference to the attached drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity. Further, in the drawings, elements having the same functions within the same scope of the inventive concept will be designated by the same reference numerals.

In the drawings, irrelevant descriptions will be omitted to clearly describe the present disclosure, and to clearly express a plurality of layers and areas, thicknesses may be magnified. The same elements having the same function within the scope of the same concept will be described with use of the same reference numerals. Throughout the specification, when a component is referred to as "comprise" or "comprising," it means that it may include other components as well, rather than excluding other components, unless specifically stated otherwise.

In the drawings, a first direction may be defined as a stacking direction or a thickness (T) direction, a second direction may be defined as a length (L) direction, and a third direction may be defined as a width (W) direction.

Figure 1A:
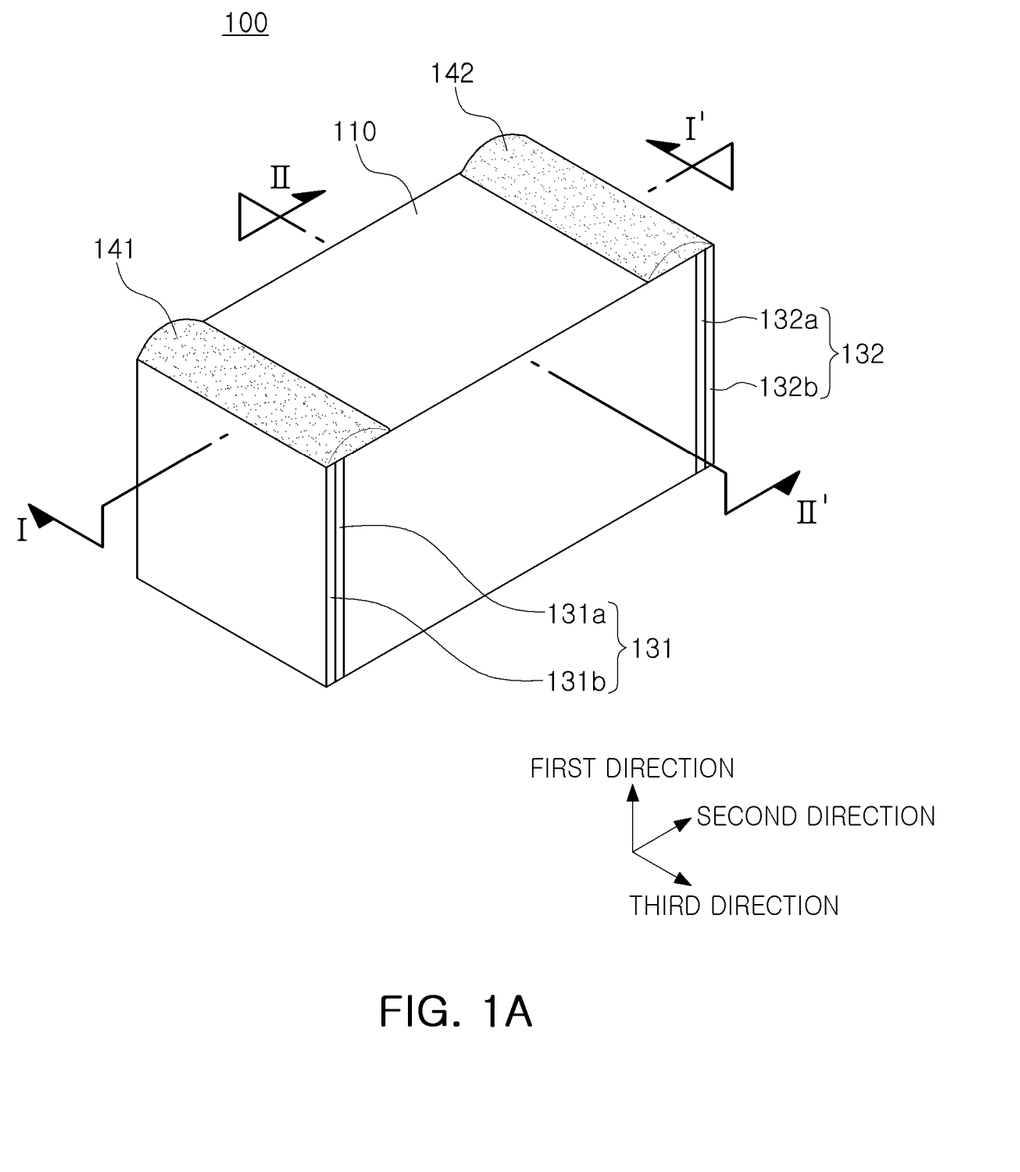
FIG. 1A is a schematic perspective view of a multilayer electronic component according to an embodiment of the present disclosure.

FIG. 1A is a schematic perspective view of a multilayer electronic component according to an embodiment of the present disclosure.

Figure 1B:
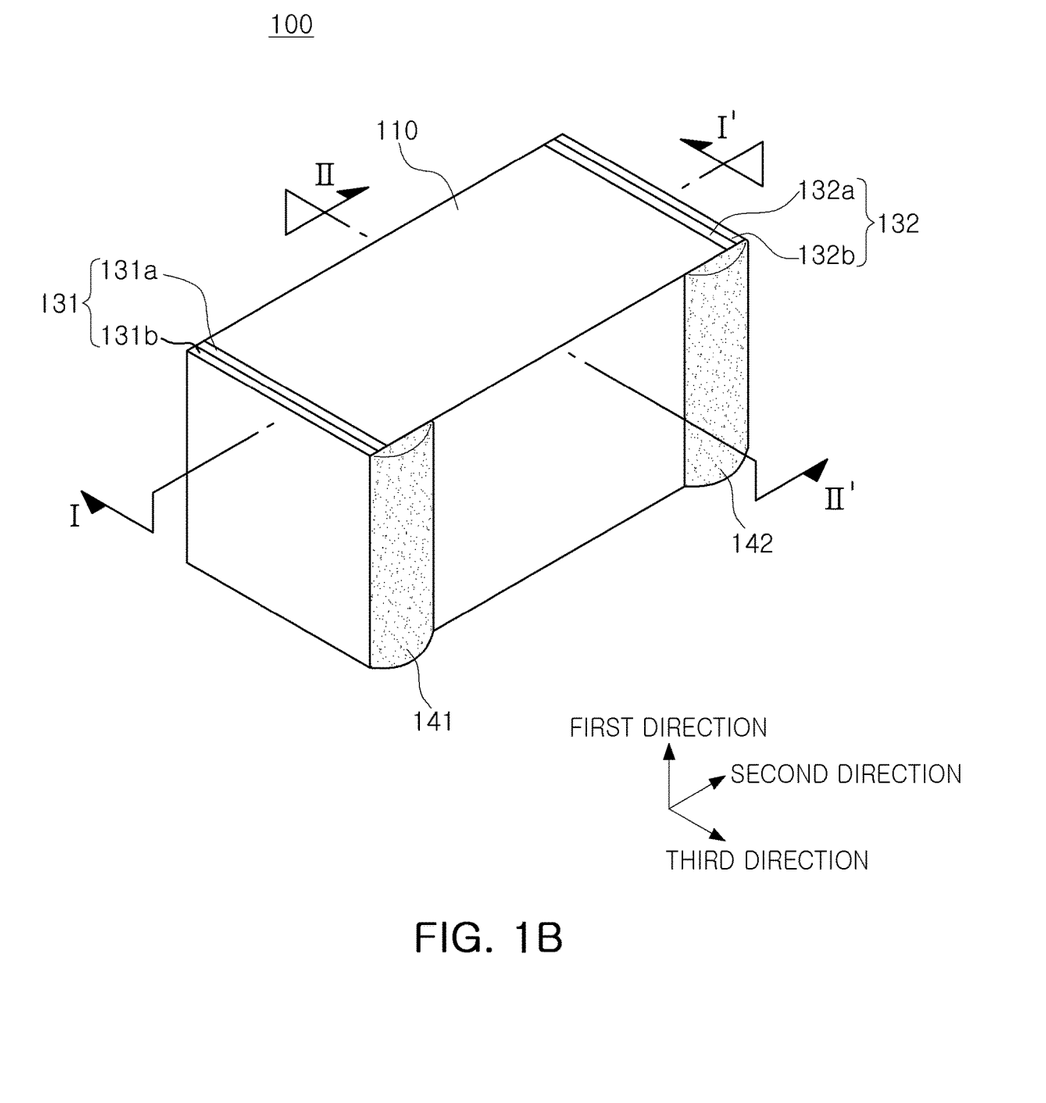
FIG. 1B is a schematic perspective view of a multilayer electronic component according to an embodiment of the present disclosure.
Figure 2:
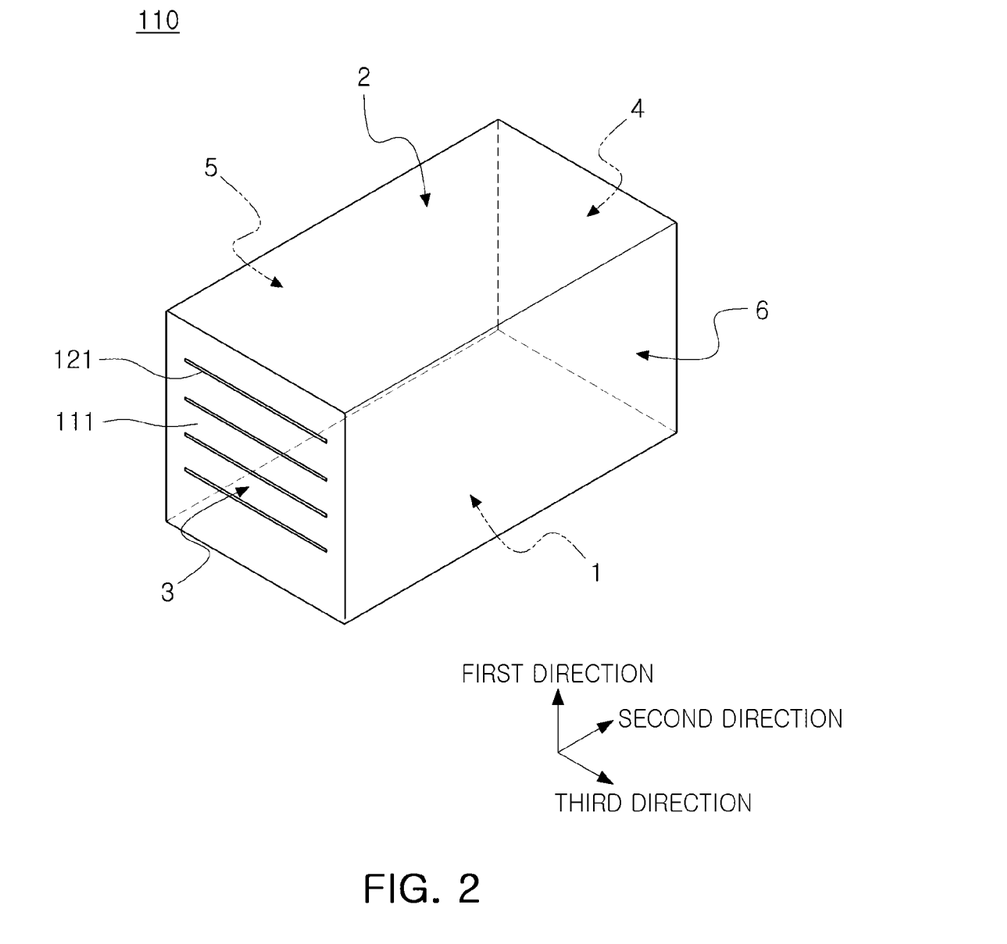
FIG. 2 is a schematic perspective view of a body except for a connection portion and an external electrode in FIGS. 1A and 1B.

FIG. 2 is a schematic perspective view of a body except for a connection portion and an external electrode in FIGS. 1A and 1B.

Figure 3:
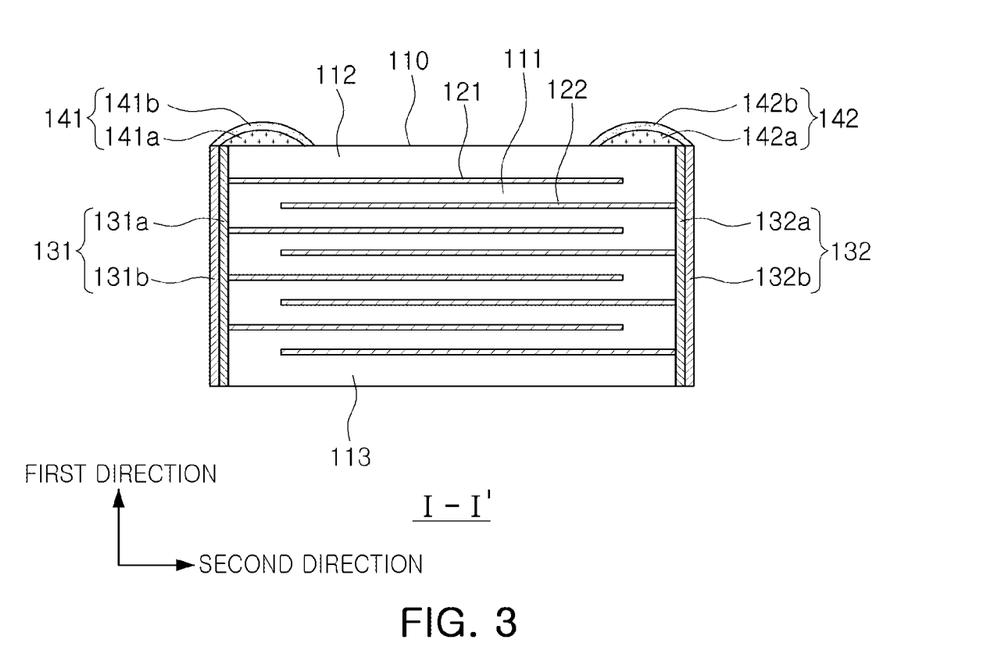
FIG. 3 is a cross-sectional view taken along line I-I' of FIG. 1A.

FIG. 3 is a cross-sectional view taken along line I-I' of FIG. 1A.

Figure 4:
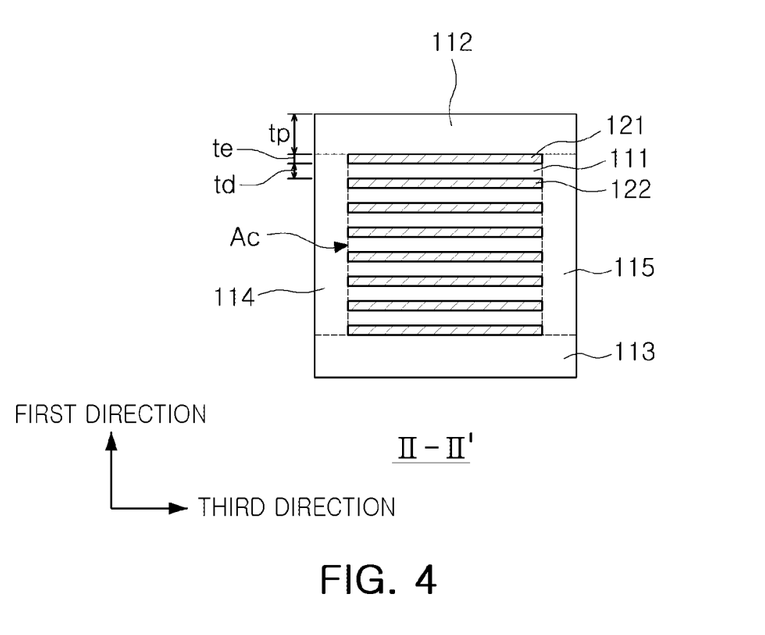
FIG. 4 is a cross-sectional view taken along II-II' of FIG. 1A.

FIG. 4 is a cross-sectional view taken along II-II' of FIG. 1A.

Figure 5:
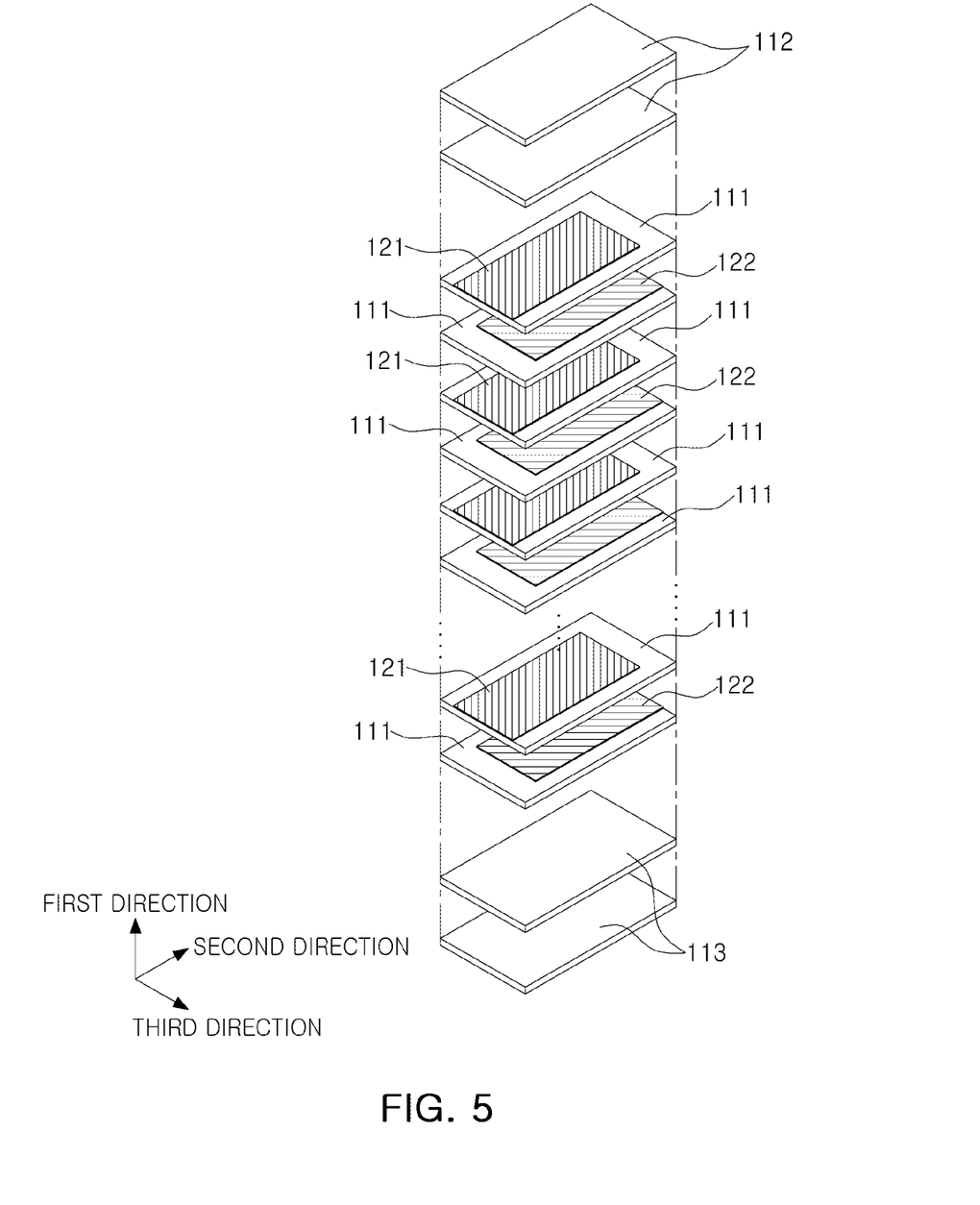
FIG. 5 is an exploded perspective view schematically illustrating an exploded body in which a dielectric layer and an internal electrode are stacked according to an embodiment of the present disclosure.

FIG. 5 an exploded perspective view schematically illustrating an exploded body in which a dielectric layer and an internal electrode are stacked according to an embodiment of the present disclosure.

Hereinafter, a multilayer electronic component 100 according to an embodiment of the present disclosure will be described with reference to FIGS. 1A to 5.

According to an embodiment of the present disclosure, a multilayer electronic component 100 includes: a body 110 including a dielectric layer 111, and first and second internal electrodes 121 and 122 alternately disposed with the dielectric layer interposed therebetween in a first direction, and including first and second surfaces 1 and 2 opposing in the first direction, third and fourth surfaces 3 and 4 connected to the first and second surfaces and opposing in a second direction, and fifth and sixth surfaces 5 and 6 connected to the first to fourth surfaces and opposing in a third direction; a first connection portion 131 including a first conductive layer 131a disposed on the third surface and connected to the first internal electrode 121, and a first insulating layer 131b disposed on the first conductive layer 131a; a second connection portion 132 including a second conductive layer 132a disposed on the fourth surface and connected to the second internal electrode 122, and a second insulating layer 132b disposed on the second conductive layer 132a; a first external electrode 141 including a first electrode layer 141a connected to the first conductive layer 131a, and a first plating layer 141b disposed on the first electrode layer 141a, wherein the first external electrode 141 is disposed on any one of the first, second, fifth, and sixth surfaces; and a second external electrode 142 including a second electrode layer 142a connected to the second conductive layer 132a, and a second plating layer 142b disposed on the second electrode layer 142a, wherein the second external electrode 142 is disposed to be spaced apart from the first external electrode on a surface on which the first external electrode 141 is disposed.

The body 110 is formed by alternately stacking a dielectric layer 111 and internal electrodes 121 and 122.

The specific shape of the body 110 is not particularly limited, but as illustrated, the body 110 may have a hexahedral shape or a shape similar thereto. Due to shrinkage of ceramic powder included in the body 110 during a sintering process, the body 110 may have a substantially hexahedral shape, but may not have a hexahedral shape having completely straight lines.

The body 110 may have first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first and second surfaces 1 and 2, connected to the third and fourth surfaces 3 and 4 and opposing each other in a third direction.

A plurality of dielectric layers 111 forming the body 110 may be in a sintered state, and a boundary between adjacent dielectric layers 111 may be integrated to such an extent that it may be difficult to identify layers of the device without using a scanning electron microscope (SEM).

According to an embodiment of the present disclosure, a raw material for forming the dielectric layer 111 is not particularly limited, as long as sufficient capacitance may be obtained therewith. For example, a barium titanate-based material, a lead composite perovskite-based material, a strontium titanate-based material, or the like may be used. The barium titanate-based material may include a $BaTiO_3$-based ceramic powder, and examples of the ceramic powder may include $BaTiO_3$, or $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$, in which calcium (Ca), zirconium (Zr), or the like is partially dissolved into $BaTiO_3$, and the like.

In addition, as a raw material for forming the dielectric layer 111, various ceramic additives, organic solvents, plasticizers, binders, dispersants, or the like may be added to powder particles such as barium titanate ($BaTiO_3$) according to the purpose of the present disclosure.

Meanwhile, a thickness td of the dielectric layer 111 is not particularly limited. However, in order to more easily achieve miniaturization and high capacitance of the multilayer electronic component, the thickness td of the dielectric layer 111 may be 0.6 μm or less. Here, the thickness td of the dielectric layer 111 may mean an average thickness of the dielectric layer 111.

The body 110 may include a capacitance formation portion Ac disposed in the body 110, and including a first internal electrode 121 and a second internal electrode 122 disposed to oppose each other with the dielectric layer 111 interposed therebetween and having capacitance formed therein, and cover portions 112 and 113 formed in above and below the capacitance formation portion Ac in a first direction.

In addition, the capacitance formation portion Ac is a portion serving to contribute to capacitance formation of the capacitor, and may be formed by repeatedly laminating a plurality of first and second internal electrodes 121 and 122 with a dielectric layer 111 interposed therebetween.

The cover portions 112 and 113 may include an upper cover portion 112 disposed above the capacitance formation portion Ac in the first direction, and a lower cover portion 113 disposed below the capacitance formation portion Ac in the first direction.

The upper cover portion 112 and the lower cover portion 113 may be formed by laminating a single dielectric layer or two or more dielectric layers on the upper and lower surfaces of the capacitance formation portion Ac in a thickness direction, respectively, and the upper cover portion 112 and the lower cover portion 113 may serve to basically prevent damage to the internal electrodes due to physical or chemical stress.

The upper cover portion 112 and the lower cover portion 113 may not include internal electrodes, and may include the same material as that of the dielectric layer 111.

That is, the upper cover portion 112 and the lower cover portion 113 may include a ceramic material, for example, a barium titanate(BaTiO$_3$)-based ceramic material.

Meanwhile, the thickness of the cover portions 112 and 113 need not be particularly limited. However, a thickness tp of the cover portions 112 and 113 may be 20 μm or less in order to more easily achieve miniaturization and high capacitance of the multilayer electronic component.

In addition, margin portions 114 and 115 may be disposed on a side surface of the capacitance formation portion Ac.

The margin portions 114 and 115 may include a margin portion 114 disposed on the fifth surface 5 of the body 110 and a margin portion 115 disposed on the sixth surface 6 of the body 110. That is, the margin portions 114 and 115 may be disposed on both end surfaces of the ceramic body 110 in a width direction.

The margin portions 114 and 115 may mean regions between an interface of both ends of the first and second internal electrodes 121 and 122 and the body 110 cut in a cross-section of the body 110 in a width-thickness (W-T) direction, as shown in FIG. 3.

The margin portions 114 and 115 may basically serve to prevent damage to the internal electrodes due to physical or chemical stresses.

The margin portions 114 and 115 may be formed by applying a conductive paste onto the ceramic green sheet, except where margin portions are to be formed, to form an internal electrode.

In addition, in order to suppress a step by the internal electrodes 121 and 122, after the internal electrodes are cut so as to be exposed to the fifth and sixth surfaces 5 and 6 of the body after lamination, the margin portions 114 and 115 may also be formed by laminating a single dielectric layer or two or more dielectric layers on both side surfaces of the capacitance formation portion Ac in a third direction (a width direction).

The internal electrodes 121 and 122 may be alternately disposed with the dielectric layer 111.

The internal electrodes 121 and 122 may include first internal electrodes 121 and second internal electrodes 122. The first and second internal electrodes 121 and 122 may be alternately disposed to face each other with the dielectric layer 111 constituting the body 110 interposed therebetween, and may be exposed to the third and fourth surfaces 3 and 4 of the body 110, respectively.

Referring to FIG. 3, the first internal electrode 121 may be spaced apart from the fourth surface 4 and exposed through the third surface 3, and the second internal electrode 122 may be spaced apart from the third surface 3 and exposed through the fourth surface 4. A first conductive layer 131a may be disposed on the third surface 3 of the body and connected to the first internal electrode 121, and a second conductive layer 132a may be disposed on the fourth surface 4 of the body and connected to the second internal electrode 122.

That is, the first internal electrode 121 may not be connected to the second conductive layer 132a and connected to the first conductive layer 131a, and the second internal electrode 122 may not be connected to the first conductive layer 131a and connected to the second conductive layer 132a. Accordingly, the first internal electrode 121 may be formed to be spaced apart from the fourth surface 4 by a predetermined distance, and the second internal electrode 122 may be formed to be spaced apart from the third surface 3 by a predetermined distance.

In this case, the first and second internal electrodes 121 and 122 may be electrically separated from each other by a dielectric layer 111 disposed in the middle.

The body 110 may be formed by alternately laminating a ceramic green sheet on which the first internal electrode 121 is printed and a ceramic green sheet on which the second internal electrode 122 is printed, and then sintering the same.

A material for forming the internal electrodes 121 and 122 is not particularly limited, and a material having excellent electrical conductivity may be used. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing a conductive paste for internal electrodes including one or more of nickel (Ni), copper (Cu), palladium (Pd), silver (Ag), gold (Au), platinum (Pt), tin (Sn), tungsten (W), titanium (Ti), and alloys thereof to a ceramic green sheet. As a printing method of the conductive paste for internal electrodes, a screen printing method or a gravure printing method may be used, but the present disclosure is not limited thereto.

Meanwhile, a thickness te of the internal electrodes 121 and 122 does not need to be particularly limited. However, in order to more easily achieve miniaturization and high capacitance of the multilayer electronic component, a thickness te of the internal electrodes 121 and 122 may be 0.6 μm or less. Here, the thickness te of the internal electrodes 121 and 122 may mean an average thickness of the internal electrodes 121 and 122.

Connection portions 131 and 132 may be disposed on the third surface 3 and the fourth surface 4 of the body 110.

The connection portions 131 and 132 may include a first connection portion 131 disposed on the third surface 3 of the body 110 and a second connection portion 132 disposed on the fourth surface 4 of the body 110.

The first connection portion 131 may include a first conductive layer 131a disposed on the third surface 3 to be connected to the first internal electrode 121 and a first insulating layer 131b disposed on the first conductive layer 131a. The second connection portion 132 may include a second conductive layer 132a disposed on the fourth surface 4 to be connected to the second internal electrode 122 and a second insulating layer 132b disposed on the second conductive layer 132a.

Conventionally, when forming an external electrode, a method of dipping a surface of the body on which an internal electrode is exposed into a paste using a paste containing a conductive metal has been mainly used. However, in the external electrode formed by the dipping method, a thickness of the external electrode in a central portion in a thickness direction may be too thick. In addition, even if there is not a problem of the thickness imbalance of the external electrodes according to the dipping method, since the internal electrode is exposed to the third and fourth surfaces of the body, the external electrode may be formed such that the thickness of the external electrode disposed on the third and fourth surfaces is greater than or equal to a certain level in order to suppress penetration of moisture and a plating solution through the external electrodes.

On the other hand, in the present disclosure, since the insulating layers 131b and 132b are disposed on the conductive layers 131a and 132a, even if the thickness of the conductive layers 131a and 132a on the third and fourth surfaces where the internal electrodes are exposed is reduced, sufficient reliability can be secured.

The first and second conductive layers 131a and 132a may have a shape corresponding to the third and fourth surfaces, respectively, as shown in FIG. 1A, and a surface of the first and second conductive layers 131a and 132a facing the body may have the same area as the third and fourth surfaces of the body, respectively. The first and second conductive layers 131a and 132a may be disposed within a range that does not deviate from the third and fourth surfaces 3 and 4. The first and second conductive layers 131a and 132a may be disposed so as not to extend to the first, second, fifth, and sixth surfaces 1, 2, 5, and 6 of the body 110.

In addition, the first and second conductive layers 131a and 132a may have a uniform and thin thickness compared to an external electrode formed by a conventional dipping method.

The method of forming the first and second conductive layers 131a and 132a is not particularly limited, but for example, the first and second conductive layers 131a and 132a may be formed by a method of transferring a sheet including a conductive metal or an organic material such as a binder to the third and fourth surfaces.

The thickness of the conductive layers 131a and 132a is not particularly limited, but may be, for example, 2 to 7 μm. Here, the thickness of the conductive layers 131a and 132a may mean a maximum thickness, and may mean a size of the conductive layers 131a and 132a in the second direction.

In an embodiment, the conductive layers 131a and 132a may include the same metal and glass as metals included in the internal electrodes 121 and 122. As the conductive layers 131a and 132a include the same metal as the metal included in the internal electrodes 121 and 122, electrical connectivity with the internal electrodes 121 and 122 may be improved, and as the conductive layers 131a and 132a include glass, bonding strength between the insulating layers 131b and 132b and the body 110 may be improved. In this case, the same metal as the metal included in the internal electrodes 121 and 122 may be Ni.

The first and second insulating layers 131b and 132b may be respectively disposed on the first and second conductive layers 131a and 132a to serve to prevent the plating layer from being formed on the conductive layers 131a and 132a. In addition, the insulating layers 131b and 132b may serve to minimize penetration of moisture or a plating solution from the outside by improving sealing characteristics.

The insulating layers 131b and 132b may include an insulating material. There is no need to specifically limit the insulating material, but, for example, the insulating material may be an insulating resin, ceramic, or the like.

The insulating layers 131b and 132b may be disposed so that the size thereof in the first direction is 80% or more of the size of the conductive layers 131a and 132a in the first direction. When the size of the insulating layers 131b and 132b in the first direction is less than 80% of the size of the conductive layers 131a and 132a in the first direction, an effect of preventing the formation of the plating layer and an effect of improving the sealing properties may be insufficient. Meanwhile, an upper limit thereof is not particularly limited, and the insulating layers 131b and 132b may be partially extended on the first and second surfaces of the body 100 within a range that does not increase the size of the multilayer electronic component 100 in the first direction.

A method of forming the insulating layers 131b and 132b does not need to be particularly limited, but for example, the insulating layers 131b and 132b may be formed by a method of transferring a sheet containing an organic material such as BaTiO$_3$ or a binder to the conductive layers 131a and 131b.

A thickness of the insulating layers 131b and 132b is not particularly limited, but may be, for example, 3 to 15 μm. Here, the thickness of the insulating layers 131b and 132b may mean a maximum thickness, and may mean the size of the insulating layers 131b and 132b in the second direction.

The external electrodes 141 and 142 may be disposed on any one of the first, second, fifth, and sixth surfaces 1, 2, 5, and 6 of the body 110.

The external electrodes 141 and 142 may include a first external electrode 141 including a first electrode layer 141a connected to a first conductive layer 131a and a first plating layer 141b disposed on the first electrode layer 141a, and a second external electrode 142 including a second electrode layer 142a connected to a second conductive layer 132a and a second plating layer 142b disposed on the second electrode layer 142a.

As the electrode layers 141a and 142a are connected to the conductive layers 131a and 132a, the electrode layers 141a and 142a and the internal electrodes 121 and 122 may be electrically connected through the conductive layers 131a and 131b.

As the external electrode formed by the conventional dipping method may be formed thickly on the third and fourth surfaces and may be formed to be partially extended on the first, second, fifth, and sixth surfaces, there was a problem in that it is difficult to secure a high effective volume ratio.

On the other hand, since the external electrodes 141 and 142 according to the present disclosure are disposed on any one of the first, second, fifth, and sixth surfaces, it is possible to secure a high effective volume ratio. In this case, a surface on which the external electrodes 141 and 142 are disposed may be a mounting surface.

When the external electrodes 141 and 142 are disposed on the first surface or the second surface, the multilayer electronic component 100 may be horizontally mounted on a substrate such that the internal electrodes 121 and 122 are parallel to the mounting surface.

In addition, when the external electrodes 141 and 142 are disposed on the fifth or sixth surface, the multilayer electronic component 100 may be vertically mounted on a substrate such that the internal electrodes 121 and 122 are perpendicular to a mounting surface.

The electrode layers 141a and 142a may be formed of any material as long as they have electrical conductivity, such as metal, and a specific material may be determined in consideration of electrical characteristics and structural stability. For example, the electrode layers 141a and 142a may be a firing electrode including a conductive metal and glass, and the electrode layers 141a and 142a may be formed by using a method of applying a paste containing a conductive metal and glass to any one of the first, second, fifth and sixth surfaces of the body.

As a conductive metal included in the electrode layers 141a and 142a, a material having excellent electrical conductivity may be used, but is not particularly limited. For example, the conductive metal may be one or more of nickel (Ni), copper (Cu), or alloys thereof.

The plating layers 141b and 142b may be disposed on the electrode layers 141a and 142a. The plating layers 141b and 142b serve to improve mounting characteristics. The type of the plating layers 141b and 142b is not particularly limited, and may be a plating layer including at least one of Ni, Sn, Pd, and alloys thereof, and may be formed of a plurality of layers.

As a more specific example of the plating layers 141b and 142b, the plating layers 141b and 142b may be a Ni plating layer or a Sn plating layer, and the plating layers 141b and 142b may have a form in which a Ni plating layer and a Sn plating layer are sequentially formed on the electrode layers 141a and 142a.

As the size of the multilayer electronic component 100 is reduced, an effect of improving capacitance per unit volume due to thinning of the external electrode increases. Accordingly, in the multilayer electronic component 100 having a size of 1005 (length×width, 1.0 mm×0.5 mm) or less, the effect of improving capacitance per unit volume according to the present disclosure may be remarkably improved.

In the case of having a size of 1005 (length×width, 1.0 mm×0.5 mm), in the case of Comparative example in which an external electrode is formed by a conventional dipping method, capacitance of 19.6 μF was implemented, and in the case of multilayer electronic component (Inventive example) according to an embodiment of the present disclosure, capacitance of 21.73 μF was implemented. It can be seen that effective capacitance is increased by about 11% in the Inventive example compared to the Comparative example, such that an effect of improving capacitance per unit volume is remarkably improved.

Accordingly, considering manufacturing errors and sizes of external electrodes, a maximum size of the multilayer electronic component 100 in the second direction may be 1.1 mm or less, and a maximum size thereof in the third direction may be 0.55 mm or less. In this case, the maximum size of the multilayer electronic component in the second direction may refer to a maximum length of the multilayer electronic component, and the maximum size of the multilayer electronic component in the third direction may refer to a maximum width of the multilayer electronic component.

Figure 6:
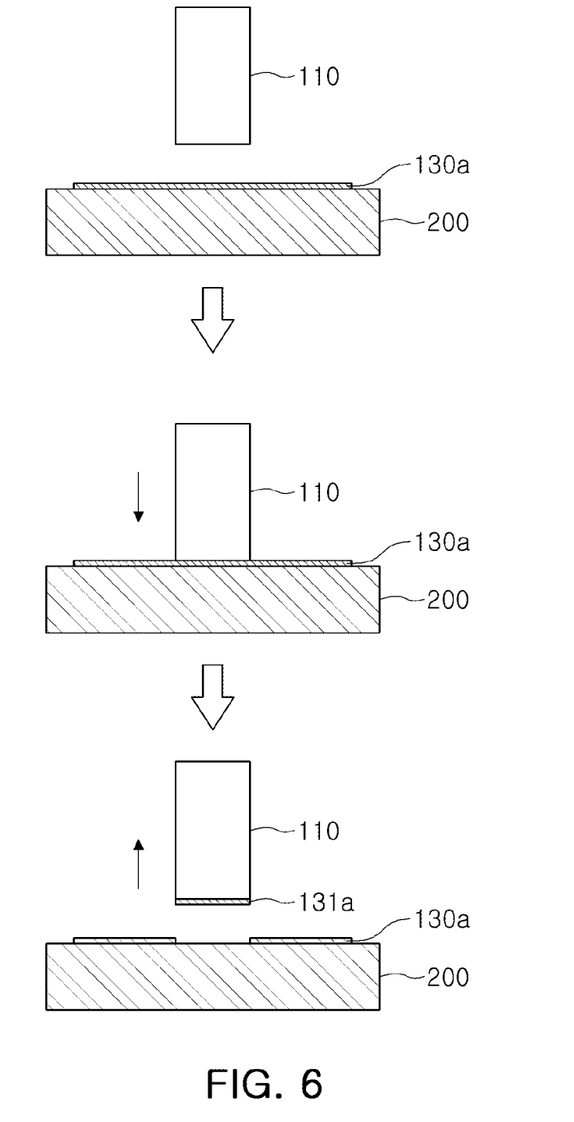
FIGS. 6 to 8 are views illustrating a method of manufacturing a multilayer electronic component according to an embodiment of the present disclosure.
Figure 7:
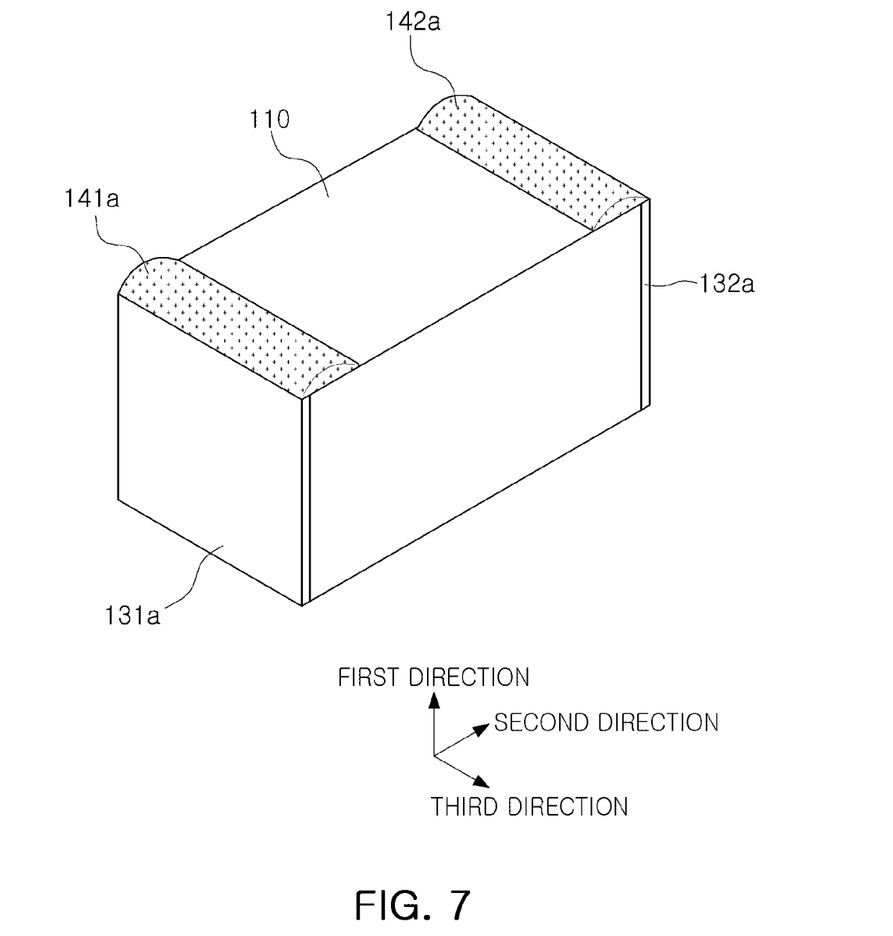
Figure 8:
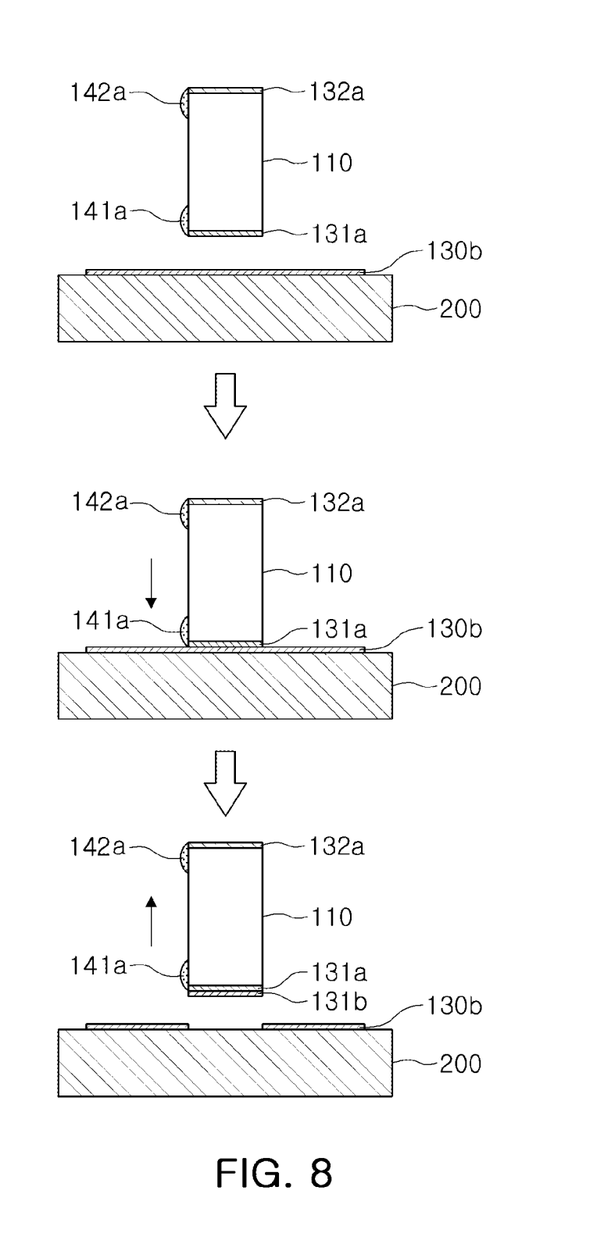

FIGS. 6 to 8 are views for explaining a method of manufacturing a multilayer electronic component according to an embodiment of the present disclosure.

Referring to FIG. 6, in the case of a process of transferring a first conductive layer 131a, a conductive sheet 130a is prepared on a support 200 and then a body 110 is compressed thereto so that the first conductive layer 131a is adhered to the third surface of the body 110. The conductive layer sheet 130a may include components such as a binder and an organic solvent before sintering. Thereafter, the same process may be repeated on the fourth surface of the body 110 to cause the second conductive layer 132a to be adhered to the fourth surface of the body 110.

Thereafter, as shown in FIG. 7, a paste for external electrodes may be applied to any one of the first, second, fifth, and sixth surfaces 1, 2, 5, and 6 of the body 100 to form first and second electrode layers 141a and 142a. As the electrode layers 141a and 142a are formed before the insulating layers 131b and 132b are formed, electrical connectivity between the conductive layers 131a and 132a and the electrode layers 141a and 142a can be sufficiently secured.

Thereafter, as shown in FIG. 8, after providing an insulating sheet 130b on a support 200, a body 110 is pressed thereto so that a first insulating layer 131b is adhered to a surface of the first conductive layer 131a. The insulating layer sheet 130b may include components such as a binder and an organic solvent in a state before sintering. Thereafter, the same process may be repeated on the fourth surface of the body 110 to cause the second insulating layer 132b to be adhered to a surface of the second conductive layer 132a.

Thereafter, plating layers 141b and 142b may be formed on the electrode layers 141a and 142a by performing a plating process. As the plating layers 141b and 142b are formed after the insulating layers 131b and 132b are formed on the conductive layers 131a and 132, by preventing the plating layer from being formed on the conductive layers 131a and 132a, the size of the multilayer electronic component in the second direction can be minimized, thereby improving capacitance per unit volume.

Figure 9:
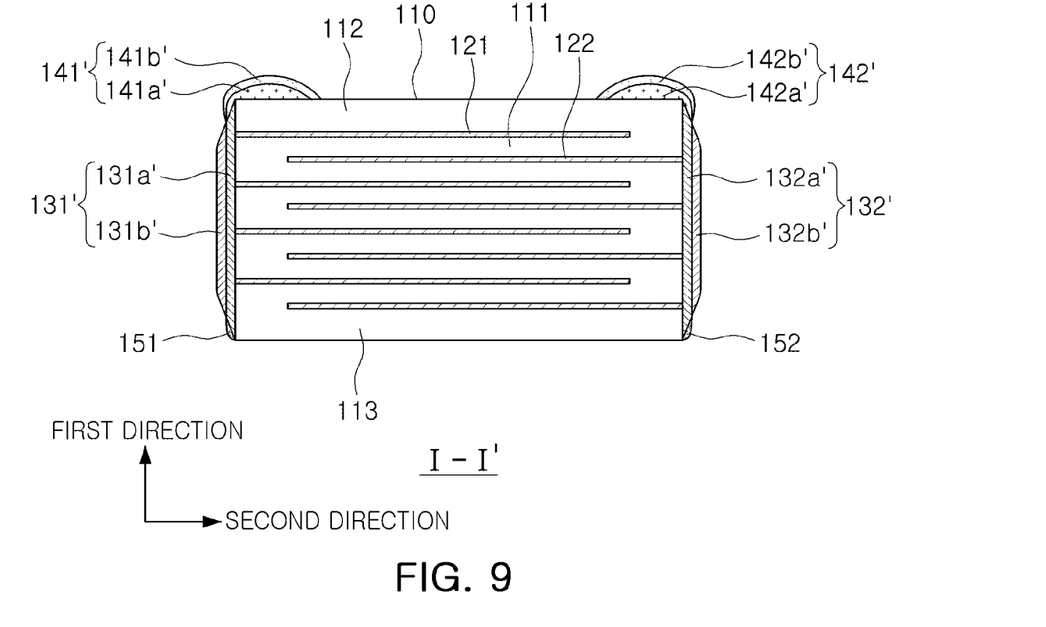
FIG. 9 is a cross-sectional view taken along line II-II' of FIG. 1A as a modified example of an embodiment of the present disclosure.

FIG. 9 is a cross-sectional view taken along line I-I' of FIG. 1A as a modified example of an embodiment of the present disclosure.

Referring to FIG. 9, a first electrode layer 141a' of a first external electrode 141' may be disposed to extend to cover one end portion of the first conductive layer 131a' of a first connection portions 131' in a first direction, and the second electrode layer 142a' of a second external electrode 142' may be disposed to extend to cover one end portion of second conductive layer 132a' of a second connection portions 132' in a first direction. Accordingly, by increasing a bonding area between the electrode layers 141a' and 142a' and the conductive layers 131a' and 132a', electrical connectivity can be improved.

In this case, a thickness of one end portion of the first and second conductive layers 131a' and 132a' in the first direction may be thinner than a thickness at a center thereof in the first direction. Here, the thicknesses of the first and second conductive layers 131a' and 132a' may mean sizes thereof in a second direction. Accordingly, by increasing a bonding area between the electrode layers 141a' and 142a' and the conductive layers 131a' and 132a', it is possible to prevent an effective volume ratio from being deteriorated while improving electrical connectivity.

As a method of transferring a sheet is used, the conductive layers 131a' and 132a' may have a uniform and thinner thickness than the conventional dipping method, but as the sheet is cut by compression, a portion of the sheet sticks to the body, so both end portions of the conductive layers 131a' and 132a' in the first direction receive more pressure than that in the central portion, so that the thickness thereof may be reduced. Accordingly, the thickness of the other end portion of the first conductive layers 131a' and 132a' in the first direction may also be lower than the thickness in a center thereof in the first direction.

In addition, insulating layers 131b' and 132b' may be disposed such that a size thereof in a first direction is 80% or more of the size of the conductive layers 131a' and 132a' in the first direction. When a maximum size of the insulating layers 131b' and 132b' in the first direction is smaller than a maximum size of the conductive layers 131a' and 132a', as shown in FIG. 9, the insulating layers 131b' and 132b' may be disposed so as not to cover both end portions of the conductive layers 131a' and 132a' in the first direction. In addition, both end portions of the insulating layers 131b' and 132b' in the first direction may have a thickness thinner than that of the central portion.

Therefore, the size of the first insulating layer 131b' in the first direction may be smaller than the size of the first conductive layer 131a' in the first direction, and the size of the second insulating layer 132b' in the first direction may be smaller than the size of the second conductive layer 132a' in the first direction.

Accordingly, a first additional plating layer 151 may be disposed on the other end portion of the first conductive layer 131a' in the first direction, and a second additional plating layer 152 may be disposed on the other end portion of the second conductive layer 132a' in the first direction. The first and second additional plating layers 151 and 152 are formed during a plating process for forming the plating layers 141b' and 142b', and may be formed of the same material as the plating layers 141b' and 142b'.

Figure 10:
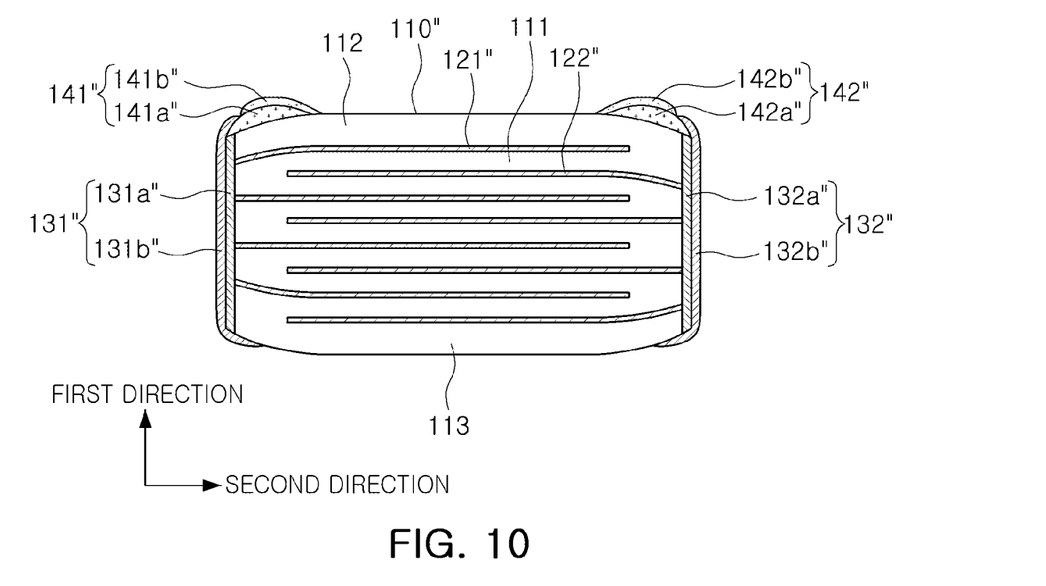
FIG. 10 is a cross-sectional view taken along line I-I' of FIG. 1A as another modified example of an embodiment of the present disclosure.

FIG. 10 is a cross-sectional view taken along line I-I' of FIG. 1A as another modified example of an embodiment of the present disclosure.

According to another modified example of the embodiment of the present disclosure, first and second external electrodes 141" and 142" may be disposed on a second surface of a body 110", a first insulating layer 131b" of a first connection portion 131" may be disposed to extend to cover one end portion of the first electrode layer 141a" and a portion of a first surface 1 of the body 110", and a second insulating layer 132b" of a second connection portion 132" may be disposed to extend to cover one end portion of the second electrode layer 142a" and a portion of the first surface.

Referring to FIG. 10, an end portion of the body 110" in a second direction may have a step as only one internal electrode of the first and second internal electrodes 121" and 122" is disposed. Accordingly, the end portion of the body 110" in the second direction may have a shape, thinner than a central portion of the body 110" in the second direction, and the first and second surfaces 1 and 2 of the body 110" at the end portion of the body 110" in the second direction may have a contracted shape toward the central portion of the body 110" in the first direction. Accordingly, a size of the body in the first direction in the central portion of the body in the second direction may be greater than a size thereof at the end portion in the first direction in the second direction. In addition, the internal electrodes 121" and 122" may also have a contracted shape from the end portion in the second direction to the central portion of the body 110" in the first direction.

The first and second insulating layers 131b" and 132b" may be disposed to extend to cover one end portion of the first and second electrode layers 141a" and 142a" and a portion of the first surface of the body 110". However, it may extend within a range that does not increase the size of the multilayer electronic component in the first direction. As described above, since the first and second surfaces 1 and 2 have a contracted shape at the end portion of the body 110" in the second direction toward the central portion of the body 110" in the first direction, even if the first and second insulating layers 131b" and 132b" extends to a portion of the body 110" on the end portion of the body 110" in the second direction, the first and second insulating layers 131b" and 132b" may be disposed without increasing the size of the multilayer electronic component in the first direction.

As set forth above, as one of various effects of the present disclosure, a capacity per unit volume of the multilayer electronic component is improved by disposing connection portions on third and fourth surfaces of the body, and disposing an external electrode on any one of the first, second, fifth and sixth surfaces of the body.

As one of various effects of the present disclosure, reliability is improved by disposing an insulating layer on a conductive layer on the connection portion.

While the exemplary embodiments have been shown and described above, it will be apparent to those skilled in the art that modifications and variations could be made without departing from the scope of the present invention as defined by the appended claims.

What is claimed is:

1. A multilayer electronic component, comprising:
   a body including a dielectric layer, and first and second internal electrodes alternately disposed in a first direction with the dielectric layer interposed therebetween, and including first and second surfaces opposing in the first direction, third and fourth surfaces connected to the first and second surfaces and opposing in a second direction, and fifth and sixth surfaces connected to the first to fourth surfaces and opposing in a third direction;
   a first connection portion including a first conductive layer disposed on the third surface and connected to the first internal electrode, and a first insulating layer disposed on the first conductive layer;
   a second connection portion including a second conductive layer disposed on the fourth surface and connected to the second internal electrode, and a second insulating layer disposed on the second conductive layer;
   a first external electrode including a first electrode layer connected to the first conductive layer, and a first plating layer disposed on the first electrode layer, wherein the first external electrode is disposed on any one of the first, second, fifth, and sixth surfaces; and
   a second external electrode including a second electrode layer connected to the second conductive layer, and a second plating layer disposed on the second electrode layer, wherein the second external electrode is disposed to be spaced apart from the first external electrode on a surface on which the first external electrode is disposed, and
   wherein in a cross-section in the first direction and the second direction, the first plating layer does not cover the first insulating layer in the second direction and the second plating layer does not cover the second insulating layer in the second direction, and
   in the cross-section in the first direction and the second direction, a thickness of each of end portions of one of the first and second electrode layers is lower than a thickness of a center portion of the one of the first and second electrode layers.

2. The multilayer electronic component of claim 1,
wherein the first conductive layer is disposed only on the third surface among the first to sixth surfaces, and the second conductive layer is disposed only on the fourth surface among the first to sixth surfaces.

3. The multilayer electronic component of claim 1,
wherein the first and second conductive layers include same metal as a metal included in the first and second internal electrodes, and include glass.

4. The multilayer electronic component of claim 3, wherein the same metal as the metal included in the first and second internal electrodes is Ni.

5. The multilayer electronic component of claim 1,
wherein a size of the first insulating layer in the first direction is 80% or more of a size of the first conductive layer in a first direction, and a size of the second insulating layer in the first direction is 80% or more of a size of the second conductive layer in the first direction.

6. The multilayer electronic component of claim 1, wherein the first and second electrode layers include a conductive metal and glass.

7. The multilayer electronic component of claim 1,
wherein a maximum size of the multilayer electronic component in the second direction is 1.1 mm or less, and a maximum size thereof in the third direction is 0.55 mm or less.

8. The multilayer electronic component of claim 1,
wherein the first and second external electrodes are disposed on the fifth surface or the sixth surface.

9. The multilayer electronic component of claim 1,
wherein the first and second external electrodes are disposed on the first surface or the second surface.

10. The multilayer electronic component of claim 9,
wherein the first electrode layer is disposed to extend to cover one end portion of the first conductive layer in the first direction, and the second electrode layer is disposed to extend to cover one end portion of the second conductive layer in the first direction.

11. The multilayer electronic component of claim 10,
wherein a thickness of the one end portion of the first and second conductive layers in the first direction is lower than a thickness in a center of the first and second conductive layers in the first direction.

12. The multilayer electronic component of claim 11,
wherein a thickness of other end portion of the first and second conductive layers in the first direction is lower than the thickness of the center of the first and second conductive layers in the first direction.

13. The multilayer electronic component of claim 12,
wherein the first and second insulating layers are disposed so as not to cover the one end portion and the other end portion of the first and second conductive layers in the first direction.

14. The multilayer electronic component of claim 13,
wherein thicknesses of the one end portion and the other end portion of the first and second insulating layers in the first direction are lower than thicknesses in a center of the first and second insulating layers in the first direction.

15. The multilayer electronic component of claim 13,
wherein a first additional plating layer is disposed on the other end portion of the first conductive layer in the first direction, and a second additional plating layer is disposed on the other end portion of the second conductive layer in the first direction.

16. The multilayer electronic component of claim 1,
wherein the first and second external electrodes are disposed on the second surface,
wherein the first insulating layer is disposed to extend to cover one end portion of the first electrode layer and a portion of the first surface, and the second insulating layer is disposed to extend to cover one end portion of the second electrode layer and a portion of the first surface.

17. The multilayer electronic component of claim 1,
wherein one of the end portions of the first electrode layer is disposed between the first insulating layer and the first conductive layer, and one of the end portions of the second electrode layer is disposed between the second insulating layer and the second conductive layer.

18. A multilayer electronic component, comprising:
a body including a dielectric layer, and first and second internal electrodes disposed in a first direction with the dielectric layer interposed therebetween, and including first and second surfaces opposing in the first direction, and third and fourth surfaces connected to the first and second surfaces and opposing in a second direction;
a first connection portion including a first conductive layer disposed on the third surface and connected to the first internal electrode;
a second connection portion including a second conductive layer disposed on the fourth surface and connected to the second internal electrode;
a first external electrode including a first electrode layer which is connected to the first conductive layer and which is spaced apart from the first internal electrode, wherein the first external electrode is disposed on the first, the second, a fifth, or a sixth of the body; and
a second external electrode including a second electrode layer which is connected to the second conductive layer and which is spaced apart from the second internal electrode, wherein the second external electrode is disposed to be spaced apart from the first external electrode on the surface on which the first external electrode is disposed,
wherein at least one of the first and second electrode layers includes glass, and a thickness of each of end portions of the at least one of the first and second electrode layers is lower than a thickness of a center portion of the at least one of the first and second electrode layers.

19. The multilayer electronic component of claim 18,
wherein the first conductive layer is disposed only on the third surface among the first to sixth surfaces, and the second conductive layer is disposed only on the fourth surface among the first to sixth surfaces.

20. The multilayer electronic component of claim 18,
wherein the first and second conductive layers include same metal as a metal included in the first and second internal electrodes, and include glass.

21. The multilayer electronic component of claim 20, wherein the same metal as the metal included in the first and second internal electrodes is Ni.

22. The multilayer electronic component of claim 18,
wherein the first connection portion further includes a first insulating layer disposed on the first conductive layer, and the second connection portion further includes a second insulating layer disposed on the second conductive layer.

23. The multilayer electronic component of claim 22, wherein a size of the first insulating layer in the first direction is 80% or more of a size of the first conductive layer in a first direction, and a size of the second insulating layer in the first direction is 80% or more of a size of the second conductive layer in the first direction.

24. The multilayer electronic component of claim 18, wherein the at least one of the first and second electrode layers further includes conductive metal.

25. The multilayer electronic component of claim 18, wherein a maximum size of the multilayer electronic component in the second direction is 1.1 mm or less, and a maximum size thereof in a third direction is 0.55 mm or less.

26. A multilayer electronic component, comprising:
a body including a dielectric layer, and first and second internal electrodes disposed in a first direction with the dielectric layer interposed therebetween, and including first and second surfaces opposing in the first direction, and third and fourth surfaces connected to the first and second surfaces and opposing in a second direction;
a first connection portion including a first conductive layer disposed on the third surface and connected to the first internal electrode;
a second connection portion including a second conductive layer disposed on the fourth surface and connected to the second internal electrode;
a first external electrode including a first electrode layer connected to the first conductive layer and a first plating layer disposed on the first electrode layer, wherein the first external electrode is disposed on only one of the first, the second, a fifth, or a sixth surface of the body; and
a second external electrode including a second electrode layer connected to the second conductive layer and a second plating layer disposed on the second electrode layer, wherein the second external electrode is disposed to be spaced apart from the first external electrode only on the surface on which the first external electrode is disposed,
wherein a thickness of each of end portions of one of the first and second electrode layers is lower than a thickness of a center portion of the one of the first and second electrode layers.

27. The multilayer electronic component of claim 26, wherein the first conductive layer is disposed only on the third surface among the first to sixth surfaces, and the second conductive layer is disposed only on the fourth surface among the first to sixth surfaces.

28. The multilayer electronic component of claim 26, wherein the first and second conductive layers include same metal as a metal included in the first and second internal electrodes, and include glass.

29. The multilayer electronic component of claim 28, wherein the same metal as the metal included in the first and second internal electrodes is Ni.

30. The multilayer electronic component of claim 26, wherein the first connection portion further includes a first insulating layer disposed on the first conductive layer, and the second connection portion further includes a second insulating layer disposed on the second conductive layer.

31. The multilayer electronic component of claim 30, wherein a size of the first insulating layer in the first direction is 80% or more of a size of the first conductive layer in a first direction, and a size of the second insulating layer in the first direction is 80% or more of a size of the second conductive layer in the first direction.

32. The multilayer electronic component of claim 30, wherein the first plating layer is also disposed on the first insulating layer, and the second plating layer is also disposed on the second insulating layer.

33. The multilayer electronic component of claim 26, wherein the first and second electrode layers include a conductive metal and glass.

34. The multilayer electronic component of claim 26, wherein a maximum size of the multilayer electronic component in the second direction is 1.1 mm or less, and a maximum size thereof in a third direction is 0.55 mm or less.

* * * * *